3,194,799
THREE-COMPONENT ALUMINUM-TITANIUM TETRAHALIDE CATALYSTS FOR OLEFIN POLYMERIZATION

Harry W. Coover, Jr., Kingsport, Tenn., assignor to Eastman Kodak Company, Rochester, N.Y., a corporation of New Jersey
No Drawing. Filed Nov. 25, 1960, Ser. No. 71,382
The portion of the term of the patent subsequent to Nov. 29, 1977, has been disclaimed and dedicated to the Public
11 Claims. (Cl. 260—93.5)

This application is a continuation-in-part of my copending application, Serial No. 724,906, filed March 31, 1958, now Patent No. 2,962,487.

This invention relates to a new and improved polymerization process and is particularly concerned with the use of a novel catalyst combination for preparing high molecular weight solid polyolefins of high density and crystallinity. In a particular aspect the invention is concerned with the preparation of polymers of styrene and butadiene and higher diolefins having a high crystallinity and a high density using a particular catalyst combination which has unexpected catalytic activity.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000 to 1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

The prior art has described the polymerization of $\alpha$-monoolefins to produce dense, highly crystalline polymers by heating said monoolefins in the presence of a mixture of aluminum and a titanium tetrahalide, and the polymerization of $\alpha$-monoolefins to form dense crystalline polymers can be effected in the presence of a catalyst formed by heating a mixture of aluminum and a titanium tetrahalide in the absence of a polymerizable hydrocarbon. This latter catalyst can be termed a preactivated catalyst and the former catalyst can be termed an unactivated catalyst. The preactivated catalyst has been found to produce unexpectedly superior results when compared with the unactivated catalyst. Both the unactivated and preactivated catalysts are particularly useful for polymerizing ethylene to form dense crystalline polymers, but when these catalysts are used for polymerizing propylene and higher $\alpha$-monoolefins the polymeric product contains substantial amounts of relatively low molecular weight polymers which are either greases, oils, or rubbery products. Obviously, when a high molecular weight, dense crystalline product is desired, these relatively low molecular weight polymers are undesirable, and it is apparent that one cannot predict the type of product that will be produced when these unactivated or preactivated catalysts are employed to polymerize specific olefinic compounds.

It is an object of this invention to provide a novel and improved process for polymerizing styrene and conjugated diolefins. It is a particular object of this invention to provide a novel and improved process for polymerizing styrene and conjugated diolefins in the presence of an improved catalyst composition containing aluminum and a titanium tetrahalide. As a result of the use of this improved catalyst composition unexpectedly improved yields of solid, dense crystalline polymer are obtained without the concomitant formation of substantial amounts of lower molecular weight polymer. Other objects of this invention will be apparent from the description and claims which follow.

The above and other objects are attained by means of this invention, wherein styrene and conjugated diolefins, either singly or in admixture, are readily polymerized to high molecular weight solid polymers by effecting the polymerization in the presence of an unactivated or a preactivated aluminum-titanium tetrahalide catalyst composition containing a third component selected from the group consisting of esters, amides and ester-amides having the formulas: $P(O)Y_3$, $PY_3$, $RC(O)Y$ and $YC(O)(CH_2)_nC(O)Y$ wherein each Y is an alkylamino ($-NR_2$) or alkoxy ($-OR$), said R being an alkyl radical containing 1 to 8 carbon atoms, and wherein $n$ is an integer of 1 to 4. The significantly improved yields of the crystalline polymers produced with the above catalyst were completely unexpected. The inventive process can be carried out in liquid phase in an inert organic liquid and preferably an inert liquid hydrocarbon vehicle, but in some instances the process is operated without a solvent. The process proceeds with excellent results over a temperature range of from 20° C. to 200° C. although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30 to 1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of polymers of 1,3-butadiene, styrene and mixtures thereof, and it can be used to polymerize other conjugated diolefins, and mixtures thereof, containing up to 6 carbon atoms. The results obtained by polymerizing the various olefins are quite unexpected. The crystallinity of the polymer as well as the average molecular weight of the product are substantially and unexpectedly improved. The high molecular weight, high density polymers of this invention are insoluble in solvents at ordinary temperatures but they are soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture.

The polymers prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polypropylene obtained according to this process.

As has been indicated above, the improved results obtained in accordance with this invention depend upon the particular catalyst combination. Thus, one of the components of the catalyst is aluminum and another component is a titanium tetrahalide wherein the halogen is selected from the group consisting of chlorine, bromine and iodine. The third component of the catalyst composition is selected from the group consisting of esters, amides and ester-amides having the formulas: $P(O)Y_3$, $PY_3$, $RC(O)Y$ and $YC(O)(CH_2)_nC(O)Y$ wherein each Y is an alkylamino ($-NR_2$) or alkoxy ($-OR$), said R being an alkyl radical containing 1 to 8 carbon atoms, and wherein $n$ is an integer of 1 to 4. Among the specific compounds that can be used are tris-N,N-dimethyl phosphoramide, triethyl phosphate, mixed phosphate esteramides, triethyl phosphite, N,N-dimethyl acetamide, adipamide and the like.

The limiting factor in the temperature of the process appears to be the decomposition temperature of the catalyst. Ordinarily tempertaures from 50° C. to 150° C. are employed, although temperatures as low as 20° C. or as high as 250° C. can be employed if desired. Usually, it is not desirable or economical to effect the polymerization at temperatures below 20° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses. The catalyst compositions of this invention, when reacted with water do not produce hydrogen.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymer of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example up to 40% and higher are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

The titanium tetrahalide in the catalyst is usually employed in an amount of from 0.1 to 45 parts by weight per part of aluminum metal, and the molar ratio of titanium tetrahalide to the third component of the catalytic mixture can be varied within the range of 1:1 to 1:0.1. A particularly effective catalyst contains one mole of titanium tetrahalide and 0.25 mole of the third component per mole of aluminum. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, iso-octane, methyl cyclohexane, tetralin, decalin, and any of the other well known inert liquid hydrocarbons.

The polymerization ordinarily is accomplished by merely admixing the components of the polymerization mixture which is then adjusted to the reaction temperature. The more elevated temperatures can be used to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing styrene and conjugated diolefins in accordance with this invention is a mixture of aluminum, titanium tetrachloride and hexamethyl phosphoric triamide. The importance of the third component of this reaction mixture is evident from the fact that the presence of the third component makes possible the production of polymers of substantially improved properties.

The aluminum and titanium tetrahalide that are employed in the catalytic mixture of this invention can be in either the unactivated or the preactivated form. When the unactivated form is employed the aluminum and titanium tetrahalide as well as the third component of the catalyst are added to the polymerization reaction mixture, and in most instances it is usually necessary to undergo an induction period before the monomer in the reaction mixture is actually polymerized to the desired product. Preferably the aluminum and titanium tetrahalide are employed in a preactivated form. For preactivation of the catalyst a mixture of aluminum and titanium tetrahalide is heated for varying periods of time in the absence of polymerizable monomer, such as ethylene, propylene and higher monolefins. Temperatures of 50° C. up to about 300° C. are usually sufficient for the preactivation, and contact times varying from 5 minutes to 48 hours can be used. The catalytic mixture that is formed as a result of the preactivation of aluminum and titanium tetrahalide has been found to contain aluminum trihalide and titanium trihalide in addition to aluminum and titanium tetrahalide. This mixture along with the third component of the catalyst described above is outstandingly effective for polymerizing the monomers while at the same time reducing substantially the amount of low molecular weight polymer formed during the reaction. The aluminum that is employed in the catalyst mixture is preferably in flake or finely divided form for optimum activity, rapid polymerization and high yield of polymer but actually any form of aluminum metal can be used in the process. When a granular aluminum of commerce is used it is desirable to clean the surface of the granules with an acid or acid mixtures such as a mixture of nitric and hydrofluoric acids or with a base for optimum results. However, the cleaning of the aluminum is not absolutely essential to the invention. Titanium tetrachloride is the preferred titanium tetrahalide although titanium tetrabromide as well as titanium tetraiodide can be employed in the catalytic mixture.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly from butadiene and styrene, having properties not heretofore obtainable.

The novel catalyst defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatc alcohols such as methanol.

The catalyst compositions of this invention can be used for polymerizing conjugated diolefins or alkadienes containing 4 to 6 carbon atoms and styrene. Among the diolefins that can be polymerized are butadiene, isoprene, 1,3-pentadiene and the like.

The diluents employed in practicing this invention can be advantageously purified prior to use in the polymerization reaction by contacting the diluent, for example, in a distillation procedure or otherwise, with the polymerization catalyst to remove undesirable trace impurities.

Thus, by means of this invention polymers are readily produced using a catalyst combination whose improved effectiveness could not have been predicted. The polymers thus obtained can be extruded, mechanically milled, cast or molded as desired. The polymers can be used as blending agents with relatively more flexible polyhydrocarbons to give any desired combination of properties. The polymers can also be blended with antioxidants, stabilizers, plasticizers, fillers, pigments, and the like, or mixed with other polymeric materials, waxes and the like.

The following examples are illustrative of this invention.

*Example I*

In a nitrogen-filled dry box a 7-oz. tapered pressure bottle was charged in order with 40 ml. of dry benzene, 20 g. of dry styrene monomer and 1 g. of a catalyst consisting of an activated aluminum-titanium tetrachloride mixture and hexamethyl phosphoric triamide in a molar ratio of 1:1 to .75. The bottle was capped, placed on a rotating wheel in a constant temperature water bath maintained at 70° C. and was allowed to remain under these conditions for 24 hours. At the end of this period the bottle was removed, allowed to cool, and opened. The polymer was dissolved in hot xylene and reprecipitated by the addition of isobutanol to the xylene solution in a Waring Blendor. The polymer was washed several times with hot isobutanol and was dried. The highly crystalline polystyrene thus obtained weighed 8.3 g. and in powder form melted at 239–245° C. Good yields of crystalline polystyrene were also obtained when the hexamethyl phosphoric triamide was replaced with triethyl phosphite, triethyl phosphate, or N,N-dimethylacetamide.

*Example II*

Inside a nitrogen-filled dry box, the following materials were placed into a 285 ml. stainless steel autoclave: 100 ml. of dry mineral spirits, a total of 2 g. of a 1:1 to .25 molar ratio of preactivated aluminum-titanium tetrachloride and hexamethyl phosphoric triamide. The autoclave was then placed in a rocker, attached to a source of liquid 1,3-butadiene and 100 ml. of anhydrous liquid 1,3-butadiene monomer was added. Rocking was initiated and the mixture was heated to 85° C. and maintained at this temperature during the polymerization period of 4 hours. At the end of this period dry isobutyl alcohol was added to deactivate the catalyst, and then the polymer was washed with hot dry isobutyl alcohol to remove the catalyst residue. The resulting polybutadiene weighed 22.5 g. and consisted substantially of the trans-1,4-polymer. Similar results were obtained when the hexamethyl phosphoric triamide constituent of the catalyst was replaced by adipamide or N,N,N',N'-tetramethyladipamide. Similar results were also obtained when the titanium tetrachloride constituent of the catalyst was replaced by means of titanium tetraiodide.

*Example III*

The procedure of Example II was used to polymerize 1,3-pentadiene with no solvent present, and using 1 g. of catalyst comprised of aluminum metal, titanium tetrabromide and butyl benzoate in a 1:2:2 molar ratio. The poly(1,3-pentadiene) thus obtained weighed 21 g. and had an inherent viscosity in tetralin at 145° C. of 1.31.

*Example IV*

The procedure of Example II was followed to polymerize isoprene using 2 g. of catalyst comprised of aluminum metal, titanium tetraiodide and ethyl N,N'-tetraethylamidophosphate 1:2:1 molar ratio. The resulting polyisoprene weighed 28 g. and had an inherent viscosity in tetralin at 145° C. of 1.65. This polymer consisted largely of the trans-1,4-polyisoprene. Similar results were obtained when the ethyl N,N'-tetraethylamidophosphate constituent of the above catalyst was replaced by means of either triethyl phosphite or triethyl phosphate.

I claim:

1. In the polymerization of a hydrocarbon selected from the group consisting of styrene and conjugated diolefins containing 4 to 6 carbon atoms to form solid polymer, the improvement which comprises catalyzing the polymerization with a catalytic mixture consisting essentially of an activated aluminum-titanium tetrahalide and a third component selected from the compounds having the formulas: $P(O)Y_3$, $PY_3$, $RC(O)Y$, and $YC(O)(CH_2)_nC(O)Y$ wherein each Y is selected from the group consisting of lower alkylamino and lower alkoxy radicals, R being an alkyl radical containing 1 to 8 carbon atoms and $n$ being an integer of 1 to 4, the molar ratio of titanium tetrahalide to third component being within the range of 1:1 to 1:0.1.

2. In the polymerization of conjugated diolefins containing 4 to 6 carbon atoms to form solid polymer, the improvement which comprises effecting the polymerization in the presence of a catalytic mixture of an activated aluminum-titanium tetrahalide and a third component selected from the compounds having the formulas: P(O)Y$_3$, PY$_3$, RC(O)Y and YC(O)(CH$_2$)$_n$C(O)Y wherein each Y is selected from the group consisting of lower alkylamino and lower alkoxy radicals, R being an alkyl radical containing 1 to 8 carbon atoms and $n$ being an integer of 1 to 4, the molar ratio of titanium tetrahalide to third component being within the range of 1:1 to 1:0.1.

3. In the polymerization of styrene to form solid polymer, the improvement which comprises effecting the polymerization in the presence of a catalytic mixture of an activated aluminum-titanium tetrahalide and a third component selected from the compounds having the formulas:

P(O)Y$_3$, PY$_3$, RC(O)Y and YC(O)(CH$_2$)$_n$C(O)Y wherein each Y is selected from the group consisting of lower alkylamino and lower alkoxy radicals, R being an alkyl radical containing 1 to 4 carbon atoms and $n$ being an integer of 1 to 4, the molar ratio of titanium tetrahalide to third component being within the range of 1:1 to 1:0.1.

4. In the polymerization of 1,3-butadiene to form solid polymer, the improvement which comprises effecting the polymerization in the presence of a catalytic mixture of activated aluminum-titanium tetrachloride and hexamethyl phosphoric triamide, the molar ratio of titanium tetrachloride to hexamethyl phosphoric triamide being within the range of 1:1 to 1:0.1.

5. In the polymerization of isoprene to form solid polymer, the improvement which comprises effecting the polymerization in the presence of a catalytic mixture of activated aluminum-titanium tetrachloride and hexamethyl phosphoric triamide, the molar ratio of titanium tetrachloride to hexamethyl phosphoric triamide being within the range of 1:1 to 1:0.1.

6. In the polymerization of 1,3-pentadiene to form solid polymer, the improvement which comprises effecting the polymerization in the presence of a catalytic mixture of activated aluminum-titanium tetrachloride and hexamethyl phosphoric triamide, the molar ratio of titanium tetrachloride to hexamethyl phosphoric triamide being within the range of 1:1 to 1:0.1.

7. In the polymerization of styrene to form solid polymer, the improvement which comprises effecting the polymerization in the presence of a catalytic mixture of activated aluminum-titanium tetrachloride and hexamethyl phosphoric triamide, the molar ratio of titanium tetrachloride to hexamethyl phosphoric triamide being within the range of 1:1 to 1:0.1.

8. In the polymerization of 1,3-butadiene to form solid polymer, the improvement which comprises effecting the polymerization in the presence of a catalytic mixture of activated aluminum-titanium tetrachloride and triethyl phosphite, the molar ratio of titanium tetrachloride to triethyl phosphite being within the range of 1:1 to 1:0.1.

9. In the polymerization of 1,3-butadiene to form solid polymer, the improvement which comprises effecting the polymerization in the presence of a catalytic mixture of activated aluminum-titanium tetrachloride and triethyl phosphate, the molar ratio of titanium tetrachloride to triethyl phosphate being within the range of 1:1 to 1:0.1.

10. In the polymerization of styrene to form solid polymer, the improvement which comprises effecting the polymerization in the presence of a catalytic mixture of activated aluminum-titanium tetrachloride and triethyl phosphite, the molar ratio of titanium tetrachloride to triethyl phosphite being within the range of 1:1 to 1:0.1.

11. In the polymerization of styrene to form solid polymer, the improvement which comprises effecting the polymerization in the presence of a catalytic mixture of activated aluminum-titanium tetrachloride and triethyl phosphate, the molar ratio of titanium tetrachloride to triethyl phosphate being within the range of 1:1 to 1:0.1.

References Cited by the Examiner

UNITED STATES PATENTS

| | | | |
|---|---|---|---|
| 2,832,759 | 4/58 | Nowlin et al. | 260 |
| 2,846,427 | 8/58 | Findlay | 260 |
| 2,962,487 | 11/60 | Coover | 260—93.5 |
| 2,971,950 | 2/61 | Natta et al. | 260—93.5 |
| 2,985,640 | 5/61 | Loeb | 260—93.5 |
| 3,027,360 | 3/62 | Raum | 260—93.5 |

WILLIAM H. SHORT, *Primary Examiner.*

M. STERMAN, J. R. LIEBERMAN, L. J. BERCOVITZ, *Examiners.*